United States Patent [19]
Matsunaga

[11] Patent Number: 5,161,018
[45] Date of Patent: Nov. 3, 1992

[54] NOISE REDUCTION SYSTEM FOR COLOR TELEVISION SIGNAL

[75] Inventor: Osamu Matsunaga, Kanagawa, Japan

[73] Assignee: Sony Corporation, Tokyo, Japan

[21] Appl. No.: 691,829

[22] Filed: Apr. 29, 1991

[30] Foreign Application Priority Data

Apr. 28, 1990 [JP] Japan .................................. 2-114510
Jun. 28, 1990 [JP] Japan .................................. 2-168505

[51] Int. Cl.$^5$ .......................................... H04N 5/213
[52] U.S. Cl. ............................... 358/167; 358/105
[58] Field of Search ............... 358/174, 176, 177, 167, 358/36, 11, 140, 133, 105, 166, 37

[56] References Cited

U.S. PATENT DOCUMENTS

| | | | |
|---|---|---|---|
| 4,242,704 | 12/1980 | Ito et al. | 358/167 |
| 4,242,705 | 12/1980 | Ebihara | 358/167 |
| 4,539,594 | 9/1985 | Illetschko | 358/167 |
| 4,639,784 | 1/1987 | Fling | 358/105 |
| 4,646,138 | 2/1987 | Willis | 358/167 |
| 4,811,092 | 3/1989 | Achiha et al. | 358/105 |
| 4,954,894 | 9/1990 | Kitaura | 358/167 |
| 5,055,920 | 10/1991 | Illetschko et al. | 358/167 |
| 5,065,241 | 1/1991 | Iga | 358/167 |

FOREIGN PATENT DOCUMENTS 1-233825 9/1989 Japan .
2099657 12/1982 United Kingdom .

*Primary Examiner*—Tommy P. Chin
*Assistant Examiner*—Jeffrey S. Murrell
*Attorney, Agent, or Firm*—Lewis H. Eslinger; Jay H. Maioli

[57] ABSTRACT

A noise reducer of a signal receiving circuit system applying different manners of signal processing to moving video image and still video image regions includes a noise reduction circuit detecting a two-frame difference signal of a received video signal and deducting the two-frame difference signal from the received video signal thereby reducing remaining noise in the still video image region, in which the proportion of the two-frame difference signal to be deducted in the noise reduction circuit is controlled by the noise level of the received video signal and a signal obtained in accordance with a detected quantity of motion in the received video signal.

5 Claims, 3 Drawing Sheets

FIG. I
PRIOR ART

# NOISE REDUCTION SYSTEM FOR COLOR TELEVISION SIGNAL

BACKGROUND OF THE INVENTION

1. Field of the Invention

The present invention relates to a noise reducer for effectively reducing noise included in a video signal and, more particularly, to a noise reducer capable of improving the S/N of a received image of the MUSE system.

2. Description of Related Art

In order to achieve transmission of a high definition television signal (HDTV) through a transmission medium of a narrow band, there is developed the transmission system MUSE (Multiple Sub-Nyquist Sampling Encoding) in which the signal to be transmitted is subsampled so as to be compressed in its signal bandwidth. In such system the still video image region and the moving video image region are subjected to different manners of signal processing so that deterioration in the resolution of the video image on a display picture area becomes less noticeable visually.

As a noise reducer for use in a receiving system of such MUSE system for suppressing mixed noise in a video signal while being transmitted through a signal transmission line, there is known, for example, a circuit as shown in FIG. 4.

In the MUSE decoder of such receiving system, there are provided a signal processing block 10 for suppressing noise in a received input signal S and two delay circuits 20A and 20B each for introducing one-frame delay.

The above described signal processing block 10 is provided with a subtractor 11 for detecting a difference signal between a signal delayed by a two-frame period and an input signal, hereinafter referred to as "two-frame difference signal", a coefficient multiplier 12 for providing the output signal of the subtractor 11 with a predetermined characteristic, and an adder 13 for deducting the output of the coefficient multiplier 12 from the original video signal thereby achieving noise reduction.

In the MUSE system, one picture area of still video image is obtained through transmission of four fields and, hence, the two-frame difference signal can be considered as a noise signal component.

Since the output of the subtractor 11 thus includes the noise component, a noise reducer can be established by having this signal supplied, through the coefficient multiplier 12, to the adder 13 so that the noise component is deducted from the original signal.

The coefficient multiplier 12 is arranged such that its nonlinear characteristic is changed by a noise level control signal C obtained by detecting the level variation component of a reference signal superimposed, for example, on the clamp level of 563H or 1125H of the received video signal, whereby the noise quantity to be canceled is controlled to increase when the noise quantity of the transmitting system is increased.

Further, the coefficient multiplier 12 is provided with a characteristic to suppress its output level when the two-frame difference signal is greater than a predetermined value, taking such difference signal for a moving video image region.

The above described noise reducer can vary its noise suppression according to whether the transmitting system is good or bad, but when the S/N of the transmitting system is good, for example, its suppression becomes lower. Hence, there has been a difficulty that it cannot exhibit a sufficient effect as a noise reducer against the noise originally included in the video signal. For example, it cannot suppress the noise included in a low quality video signal prior to transmission.

Further, a slightly moving portion is taken as noise and the noise reducer operates on such portion. Hence, there has been a difficulty that a deterioration in the quality of image, corresponding to a double image in an moving video image, is produced.

SUMMARY OF THE INVENTION

The present invention has been made to overcome the above described difficulties in the prior art. Accordingly, an object of the present invention is to provide a noise reducer adapted such that noise in the still video image region is detected from a two-frame difference signal in accordance with a signal, which is obtained by making use of a motion detecting circuit typically provided in the MUSE decoder that indicates the presence or absence of a motion, and in which the quantity of noise to be deducted is calculated in accordance with the level of the noise relating to motion and the noise level signal of the transmitting system.

According to the present invention, there is provided a noise reducer, for use, for example, in the receiving circuit system of the MUSE system used for transmitting a high definition television signal, comprising a noise reduction system including a circuit for detecting a two-frame difference signal and a circuit for deducting the two-frame difference signal from the received signal and adapted such that the noise reduction system is controlled both by the noise level of the transmission system and by the motion level of the video image. Accordingly, the noise reducer is able to suppress even noise originally included in the transmitted video signal and therefore achieve an enhanced noise suppressing effect.

DESCRIPTION OF THE PREFERRED EMBODIMENT

Figure 1:
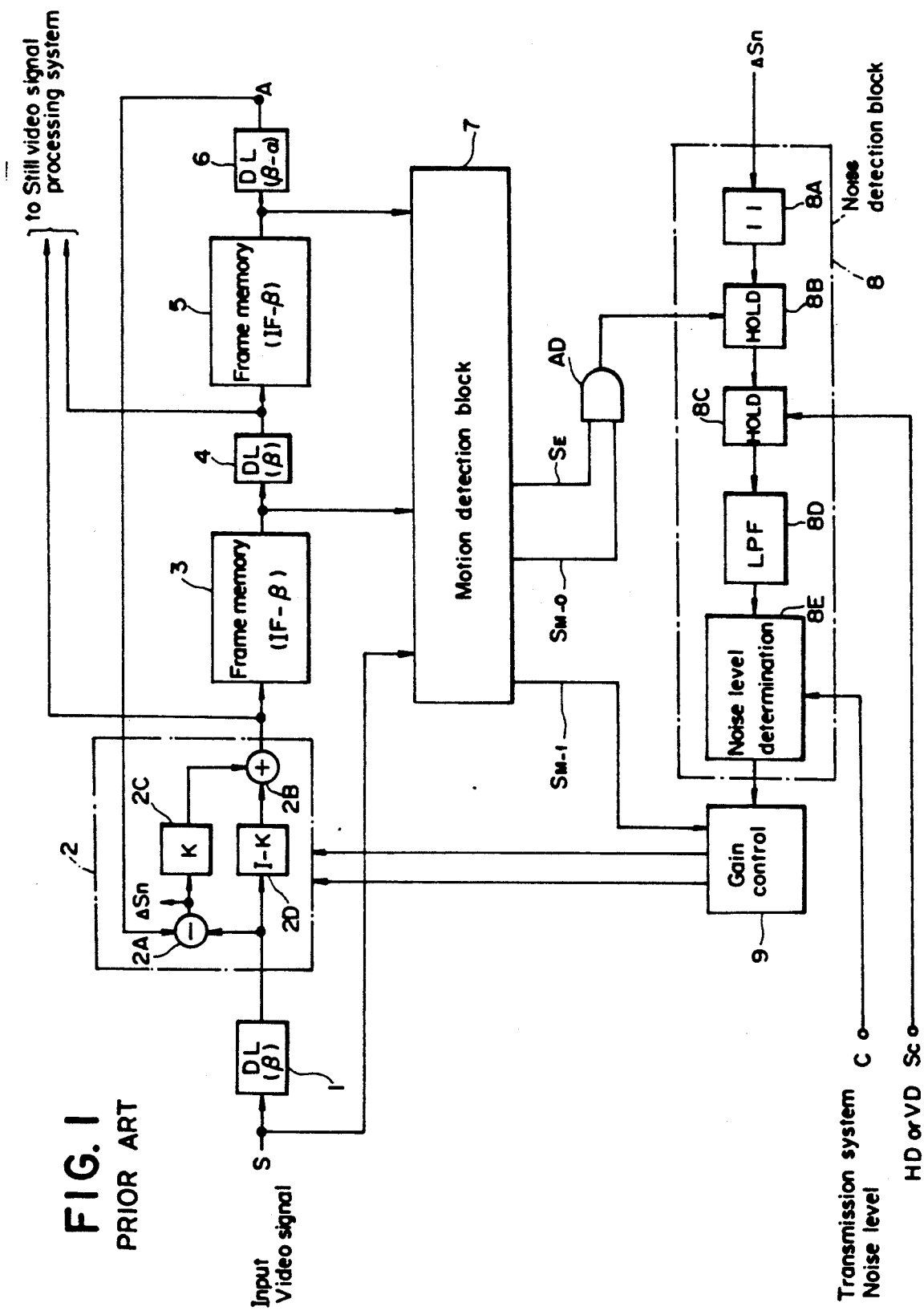
FIG. 1 is a block diagram showing an embodiment of the present invention.

FIG. 1 is a diagram showing an embodiment of a noise reducer of the present invention, in which reference numeral 1 denotes a delay circuit (delay time: $\beta$) for time matching, 2 denotes a signal processing block including, for example, subtractors 2A, 2B and coefficient multipliers 2C, 2D for deducting a noise signal component detected by making use of a two-frame difference signal from the received video signal.

Reference numerals 3 and 5 each denote a frame delay circuit for obtaining a one-frame delayed signal (a $(1F-\beta)$-frame delay circuit, to be exact), 4 denotes a delay circuit for time matching (delay time: $\beta$), 6 denotes a delay circuit provided with the processing time α required in the signal processing block 2 taken into account (delay time: β−α).

Reference numeral 7 denotes a motion detection block which is supplied with the one-frame-delayed video signal and the two-frame-delayed video signal for detecting a motion in the video image.

Reference numeral 8 denotes a noise detection block. The noise detection block 8 includes an absolute value circuit 8A, a first holding circuit 8B holding its output in response to a signal generated when a portion with no motion and being a non-edge of the video signal is detected, a second holding circuit 8C holding its output at a synchronization signal portion of the received video signal, a smoothing filter 8D, and a noise level determination circuit 8E.

The noise level determination circuit 8E is formed of a nonlinear amplifier whose output signal varies in response to the above described noise level signal C of the transmitting system or the like.

Reference numeral 9 denotes a gain control circuit for generating signals controlling the coefficients of the coefficient multipliers 2C and 2D of the signal processing block 2. The deducted quantity of the noise signal component is controlled by this gain control circuit 9 as described later.

The operation of FIG. 1 will now be described.

The video signal S received by the decoder of the MUSE system is supplied to the frame delay circuits 3 and 5 through the delay circuit 1 and the signal processing block 2 and a two-frame-delayed signal is delivered to a point A. The signal at the point A is supplied to the subtractor 2A of the signal processing block 2. A difference signal between this signal and the input video signal is obtained in the signal processing block 2 and a two-frame-difference signal $\Delta S_n$ can thereby be obtained. The two-frame-difference signal $\Delta S_n$ indicates, when the video signal is for a still video image region, a noise component superimposed on the video image, and therefore, in the case of the still video image region, the noise component is deducted from the input video signal in the subtractor 2B and, thereby, a still video image signal with the noise suppressed can be obtained.

The noise reducer of the present invention is adapted to detect a moving video image region of the input video signal by means of the motion detection block 7 which detects a motion in the video signal.

More specifically, a signal $S_{M-0}$ indicative of the quantity of motion being zero and a signal $S_E$ indicative of the video image being a non-edge portion detected by the motion detection block 7 are supplied to an AND circuit AD, and when both the signals are at the H level, a signal obtained by turning the two-frame-difference signal $\Delta S_n$ detected in the signal processing block 2 into its absolute value in the absolute value circuit 8A is held by the first holding circuit 8B and supplied to the second holding circuit 8C.

The second holding circuit 8C is also supplied with a signal $S_c$ based on a synchronization signal of the video image and is controlled by the signal $S_c$ to hold its output. The output is then supplied to the smoothing filter 8D, wherein the average level of the noise component $\Delta S_n$ is detected, and supplied to the noise level determination circuit 8E.

Figure 2:
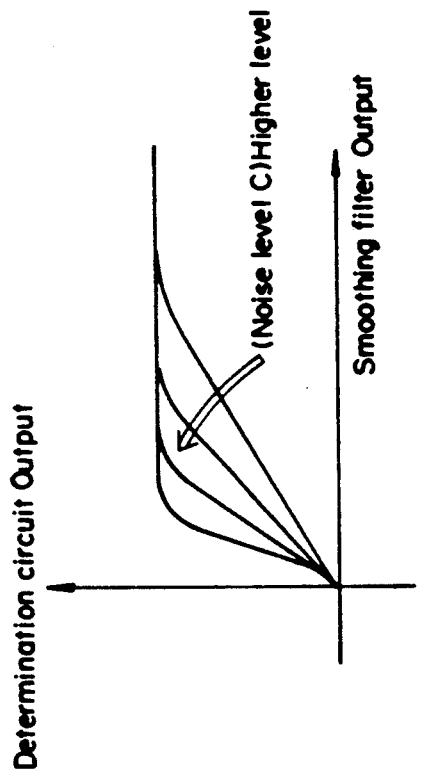
FIG. 2 is a graph showing relationships between the noise level C and the noise determination output.

The noise level determination circuit 8E is constructed of a nonlinear amplifier, whose output is varied in accordance with the noise level C of the transmitting system, for example, as shown in FIG. 2, and hence it is controlled to increase its output signal when the noise of the transmitting system is greater. In accordance with the magnitude of this output signal, the output of the gain control circuit 9 is varied, and, thereby, the multipliers of the coefficient multipliers 2C and 2D within the signal processing block 2 are controlled to establish the quantity of the noise to be canceled.

The gain control circuit 9 can also be controlled by a signal representing the quantity of motion output from the motion detection block 7.

Figure 3B:
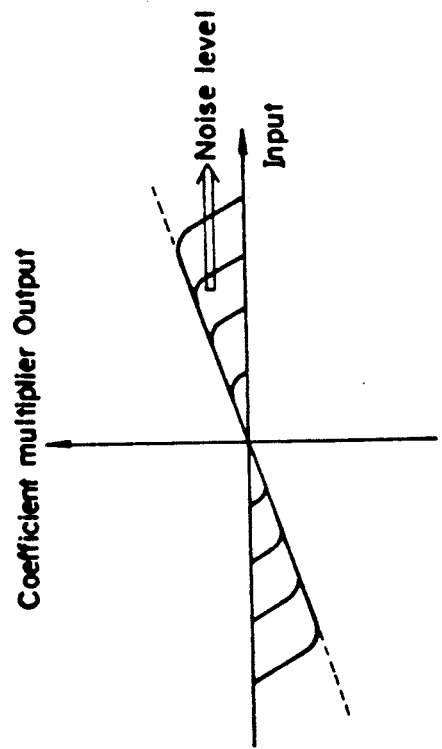
FIG. 3(a) and FIG. 3(b) are graphs showing variations in the noise quantity deducted by the noise reducer.
Figure 3A:
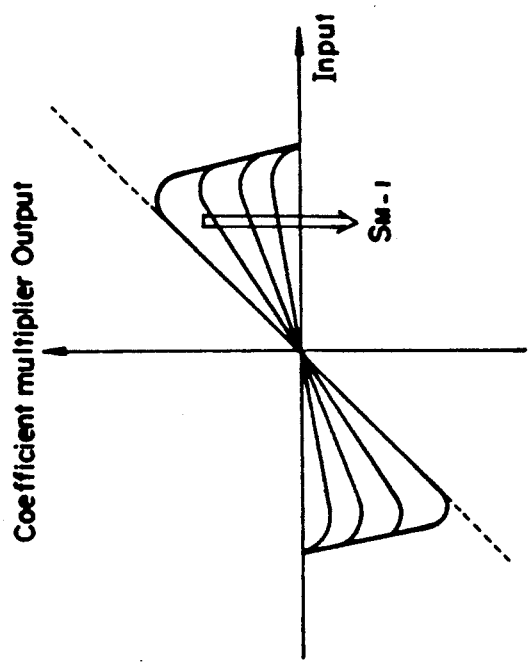
Figure 4:
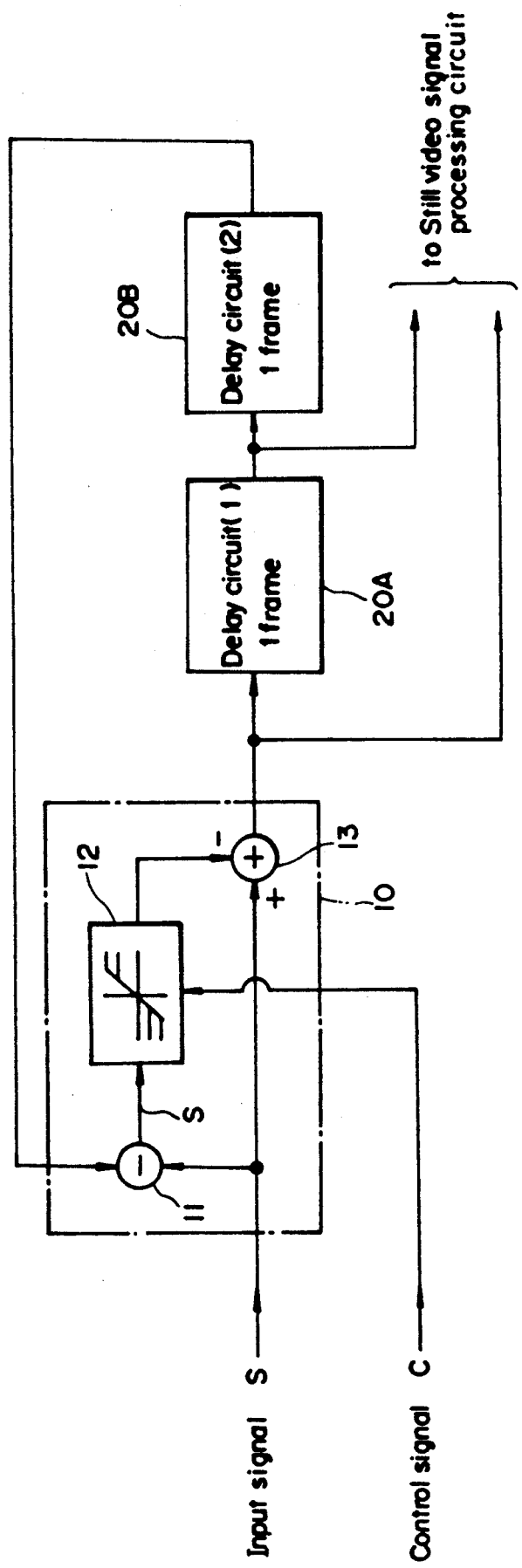
FIG. 4 is a block diagram showing a conventional noise reducer.

In this case, the control is executed, for example, such that the saturation point of the coefficient multiplier 2C is lowered when the quantity of motion $S_{M-1}$ is increased as shown in FIG. 3(a), while the saturation level is raised when the noise level is increased, as shown in FIG. 3(b).

The above described characteristic of cancellation of the noise component was shown just by way of example and other cancellation characteristics may be provided. Generally speaking, it is preferred that the control is made such that the smaller the quantity of motion and the higher the noise level is, the larger the proportion of the noise component that is deducted.

While generally in a conventional noise reducer the canceled quantity of the noise component is controlled only by the noise level of the transmitting system, the noise reducer according to the present invention is adapted such that its noise reducing effect is controlled also by the motion in the video image and the noise level originally included in the video signal. Accordingly, an advantage can be obtained that it has a good noise suppressing effect even on a video signal having a deteriorated S/N ratio such as one obtained by dubbing or on-the-spot picture taking.

What is claimed is:

1. A noise reducer for processing a received video signal comprising:
   detection means for detecting a difference between the received video signal and two-frame delayed signals of said received video signal and producing a two-frame difference signal;
   noise reduction means for deducting remaining noise from said two-frame difference signal and from the received signal in response to control signals and producing respective noise reduced signals;
   subtraction means for subtracting the noise reduced signal based on said two-frame difference signal from the noise reduced signal based on said received signal and producing a still video image signal having a noise component thereof suppressed;
   noise level detection means for detecting a noise level of an original video signal before transmission based on said two-frame difference signal;
   motion level detection means for detecting a motion condition of said received video signal; and
   control means for producing said control signals controlling the deducted ratio of said two-frame difference signal obtained by said detection means and the received video signal within said noise reduction means, said control signals being generated in accordance with said noise level of the original video signal detected by said noise level detection means and said motion condition detected by said motion level detector means; and
   wherein said noise level detection means includes an absolute value circuit receiving said two-frame difference signal and producing an output fed to a hold circuit for holding said output in response to a signal from said motion level detection means representing zero motion, the output of said hold circuit representing a detected average level of the noise component in the original signal and being fed to a nonlinear amplifier for amplifying the detected average level of the noise component in response to a signal representing a noise level of the system transmitting the received video signal and producing said signal generated in accordance with the detected noise level of the original signal fed to said control means.

2. A noise reducer according to claim 1, wherein said detection means includes two serially connected frame delay circuits for producing said two-frame difference signal that represents a noise component superimposed on said received video signal.

3. A noise reducer according to claim 2, wherein said motion level detection means is supplied with a one-frame-delayed signal from a first of said two frame delay circuits and a two-frame-delayed signal from the second of said two frame delay circuits.

4. A noise reducer according to claim 1, wherein said received video signal is a television signal of the MUSE system.

5. A noise reducer according to claim 1, wherein said noise reduction means includes a first coefficient multiplier for reducing noise in said difference signal in response to a first one of said control signals and a second coefficient multiplier for reducing noise in the received video signal in response to a second one of said control signals.

* * * * *